United States Patent [19]
Wagner et al.

[11] Patent Number: 5,359,854
[45] Date of Patent: Nov. 1, 1994

[54] ACTUATING UNIT FOR HYDRAULIC BRAKE SYSTEM

[75] Inventors: Wilfried Wagner, Huettenberg; Lothar Schiel, Hofheim, both of Germany

[73] Assignee: Alfred Teves GmbH, Frankfurt, Germany

[21] Appl. No.: 98,321
[22] PCT Filed: Nov. 2, 1992
[86] PCT No.: PCT/EP92/02509
  § 371 Date: Aug. 5, 1993
  § 102(e) Date: Aug. 5, 1993
[87] PCT Pub. No.: WO93/11010
  PCT Pub. Date: Jun. 10, 1993

[30] Foreign Application Priority Data
  Dec. 5, 1991 [DE] Germany ............... 4140066

[51] Int. Cl.$^5$ ................................. F15B 7/00
[52] U.S. Cl. ......................... 60/535; 60/577; 60/578; 60/589
[58] Field of Search .......... 60/534, 535, 552, 554, 60/562, 576, 577, 578, 589

[56] References Cited

U.S. PATENT DOCUMENTS

| | | | |
|---|---|---|---|
| 2,041,164 | 5/1936 | Carroll | 60/577 |
| 2,185,264 | 1/1940 | Mistral | 60/577 |
| 2,298,314 | 10/1942 | Sauzedde | 60/577 |
| 2,396,536 | 3/1946 | Sauzedde | 60/577 |
| 2,768,502 | 10/1956 | Sherman et al. | 60/577 |
| 3,150,493 | 9/1964 | Rike | 60/554 |
| 3,412,556 | 11/1968 | Rike et al. | 60/535 |
| 4,662,688 | 5/1987 | Reinartz | 60/577 |

FOREIGN PATENT DOCUMENTS 3317996 11/1983 Germany.

*Primary Examiner*—Edward K. Look
*Assistant Examiner*—F. Daniel Lopez
*Attorney, Agent, or Firm*—Robert P. Seitter; J. Gordon Lewis

[57] ABSTRACT

An actuating unit for a hydraulic brake system for automotive vehicles which operates by a precisely defined change-over pressure and with lost travel independent of the speed of actuation. The actuating unit includes a pneumatic brake power booster and a master brake cylinder connected downstream of the pneumatic brake power booster. The master brake cylinder contains a primary piston coupled with an annular piston of larger diameter. The annular piston confines a filling chamber which may be connected to the hydraulic pressure chamber. The annular piston is adapted to uncouple from the primary piston when the pressure acting on the annular piston reaches a predetermined amount. Thus, the displacement of the filling volume by the annular piston does not require an entire stroke of the master brake cylinder.

10 Claims, 4 Drawing Sheets

ACTUATING UNIT FOR HYDRAULIC BRAKE SYSTEM

BACKGROUND OF THE INVENTION

The present invention relates to an actuating unit for a hydraulic brake system which includes a pneumatic brake power booster and a master brake cylinder connected down-stream of the pneumatic brake power booster. The piston of the master brake cylinder confines a hydraulic pressure chamber and is coupled to an annular piston of larger diameter. The annular piston confines a filling chamber which can be connected to the pressure chamber.

A similar actuating unit is disclosed in German patent number 33 17 996. The annular piston of this actuating unit is hollow and is composed of a cylindrical inner wall and a cylindrical outer wall which are connected at one end and which confine an open annular chamber. The cylindrical outer wall of the annular piston is adapted to move through sealing elements arranged in the master cylinder housing into a filling chamber of annular cross-section at the end of the master brake cylinder close to the brake power booster. The filling chamber is arranged radially outward and coaxially relative to the first pressure chamber of the master brake cylinder. The first pressure chamber is bounded by a bottom that forms the primary piston and closes the cylindrical inner wall.

Less favorable aspects of the prior art actuating unit are its considerable axial length and its complicated structure. Another shortcoming of the prior art is that the pressure fluid volume, which on actuation is displaced by the annular piston through a complicated valve into a supply reservoir, is displaced over the entire stroke of the master brake cylinder. Thus, in the event of a slow actuation, the pressure fluid volume flows through the throttle bores provided in the valve into the supply reservoir so that no filling effect is achieved and the actuating travel is not shortened. On the other hand, in the event of a quick actuation, dynamic pressure develops in the filling chamber so that a sealing cup sealing the primary piston is flooded and the pressure in the primary pressure chamber increases until the valve is opened by the dynamic pressure. In this case, however, filling is undefined and depends on the pressure in the filling chamber. In addition, the slowly progressing release action of the actuating unit of the prior art is a disadvantage. The release action progresses slowly because both the primary chamber and the filling chamber are replenished solely through the previously mentioned throttle bores.

SUMMARY OF THE INVENTION

Therefore, it is an object of the present invention to provide an actuating unit for hydraulic brake systems which operates with a precisely defined change-over pressure and lost travel independent of the speed of actuation. Further, the present invention ensures that the displacement of the filling volume by the annular piston does not require an entire stroke of the master cylinder.

This object is achieved by the present invention in that the annular piston uncouples from the primary piston when the hydraulic pressure acting on it reaches a predetermined amount. The pressure acting upon the annular piston is the pressure prevailing in the pressure chamber of the master brake cylinder. Thus, the filling stage is activated only until a defined pressure is reached, and thereafter is terminated. Therefore, the entire actuating unit can become smaller and hence less expensive.

Another favorable improvement of the present invention over the prior art is that the annular piston, after being uncoupled, slides on the piston and cooperates with a stop. This feature limits the maximum possible stroke of the annular piston, which becomes important in the event of failure of the hydraulic circuit connected to the pressure chamber.

Another favorable embodiment of this invention is that the filling chamber serves as a supply chamber for the hydraulic pressure chamber bounded by the piston. This measure eliminates the lost travel, which has to be covered in the pressure chamber of the master brake cylinder on actuation, so that tolerances can be diminished.

Another design variant of this invention, which makes it particularly suitable for anti-lock (ABS) brake systems, is that the central valve of the piston is located between the filling chamber and the pressure chamber.

Another favorable embodiment of the present invention activates the central valve through a pin which is perpendicular to the longitudinal axis of the piston and which is arranged in an axial extension of the annular piston. Thus, guidance of the annular piston on the master cylinder piston is greatly improved.

Another feature of this invention is that the central valve is actuated through a pin disposed perpendicularly to the longitudinal axis of the piston. This pin is arranged in a ring slipped on the piston and abuts the annular piston until the predetermined pressure is reached in the pressure chamber. This design allows reduction of the overall axial length of the actuating unit.

According to another preferred embodiment of this invention, a releasable locking device, provided between the piston and the annular piston, permits the annular piston to be entrained by the piston until the predetermined pressure is reached. Therefore, the annular piston does not have to cover the entire actuating stroke of the master cylinder piston, and the effect of the sealing elements on the annular piston is eliminated. In addition, this measure allows the overall length of the actuating unit to be shortened.

The locking device in the present invention is composed of one or a plurality of resiliently loaded balls which are guided in the piston or the annular piston, respectively, and cooperate with a slope formed in the annular piston or the piston, respectively. This design variant of the present invention lends itself to manufacture at low cost.

A particularly exact adjustment of the change-over pressure acting upon the annular piston is achieved in another embodiment of this invention. In this embodiment, the locking device is formed by one or a plurality of locking elements arranged in radial bores in the piston. The locking elements cooperate with a first slope provided in the annular piston and with a second slope located on a resiliently biassed actuating piston. The actuating piston slides within the piston and is acted upon by the pressure prevailing in the pressure chamber.

Another aspect of the present invention which affords inexpensive manufacture is that the locking device is composed of a radially expandable sleeve which is slipped on the piston. The radial collar of the sleeve cooperates with an annular groove in the piston. Preferably, the annular groove is bounded by two transversely extending flanks of different ascent. The radial collar is confined by a first conical annular surface, adjacent to which is a second conical annular surface that cooperates with the flank of steeper ascent. These measures allow the annular piston and the piston to uncouple with minimal friction.

In another preferred embodiment of this invention, a spring is positioned between the annular piston and the sleeve, permitting transmission of force from the sleeve to the annular piston. Thus, the unlocking force acting between the two pistons may be defined exactly and adjusted, if so required.

Another favorable improvement of the present invention is that the annular piston has a radial annular groove which permits radial expansion of the sleeve on actuation and when the force of the spring is overcome. The friction referred to above can be influenced not only by the design of the transition between the area guiding the collar of the sleeve and the radial annular groove in the annular piston, but also by rating the spring force.

An improvement in the transmission of force between the sleeve and the annular piston is achieved by another aspect of the present invention. This aspect of the invention provides that the spring is supported on a guide portion abutting on the collar and that the cylindrical surface of this portion is guided at the bottom of the radial annular groove shaped in the annular piston.

In still another preferred embodiment of this invention, the collar of the sleeve transitions into a truncated-cone shaped area, adjacent to a cylindrical portion with an internal diameter corresponding to the diameter of the piston. The sleeve contains a plurality of axial slots, evenly spread over its periphery, which subdivide the collar into single segments and which end at the transition between the truncated-cone shaped area and the cylindrical portion. These measures allow the sleeve to properly adapt to the piston, while simultaneously facilitating expansion of the sleeve when the two pistons are uncoupled.

The sleeve is made of plastic, allowing low-noise and low-wear operation of the actuating unit.

Another feature of the present invention is that the volume of pressure fluid flows unhindered into the brake circuit connected to the pressure chamber. This is possible because the filling chamber is in communication with the pressure chamber until the predetermined pressure in the pressure chamber is attained. Thus, the change-over pressure may be precisely defined.

In a preferred embodiment of this invention, the pressure acting on the annular piston is the hydraulic pressure prevailing in the filling chamber. This ensures that undesirable variations in volume will not occur in the filling chamber after the filling stage has been deactivated. It is particularly expedient in this respect that the central valve is actuated through a pin which is perpendicular to the longitudinal axis of the piston and is arranged in a ring. This ring is slipped on the piston and abuts a stop formed fast with the master cylinder housing in the release position. This solution offers great freedom of design with respect to the opening mechanism of the central valve.

Another advantageous design of this invention is that the central valve is operated by the transmission of force between its closure member and the actuating piston guided in the piston. This design favorably conforms the closure travel of the central valve to the point in time when the locking device is deactivated.

The diameter of the piston in the area adjacent to the pressure chamber is either equal to or larger than its diameter in the guide area of the annular piston.

In order to return the annular piston to its initial position after the filling stage is deactivated, a compression spring is provided between the stop of the annular piston in the master cylinder housing and the annular piston.

Finally, the safety of an automotive vehicle equipped with an actuating unit of the present invention can be enhanced by placement of a contact device in the abutment area of the annular piston. This contact device activates a warning apparatus such as a lamp in the driver's field of vision which, by flashing, indicates to the driver an incipient malfunction in the brake system.

BRIEF DESCRIPTION OF THE DRAWINGS

Further details, features and advantages of the present invention can be taken from the following description of six embodiments with reference to the accompanying drawings.

DETAILED DESCRIPTION OF THE INVENTION

Figure 1:
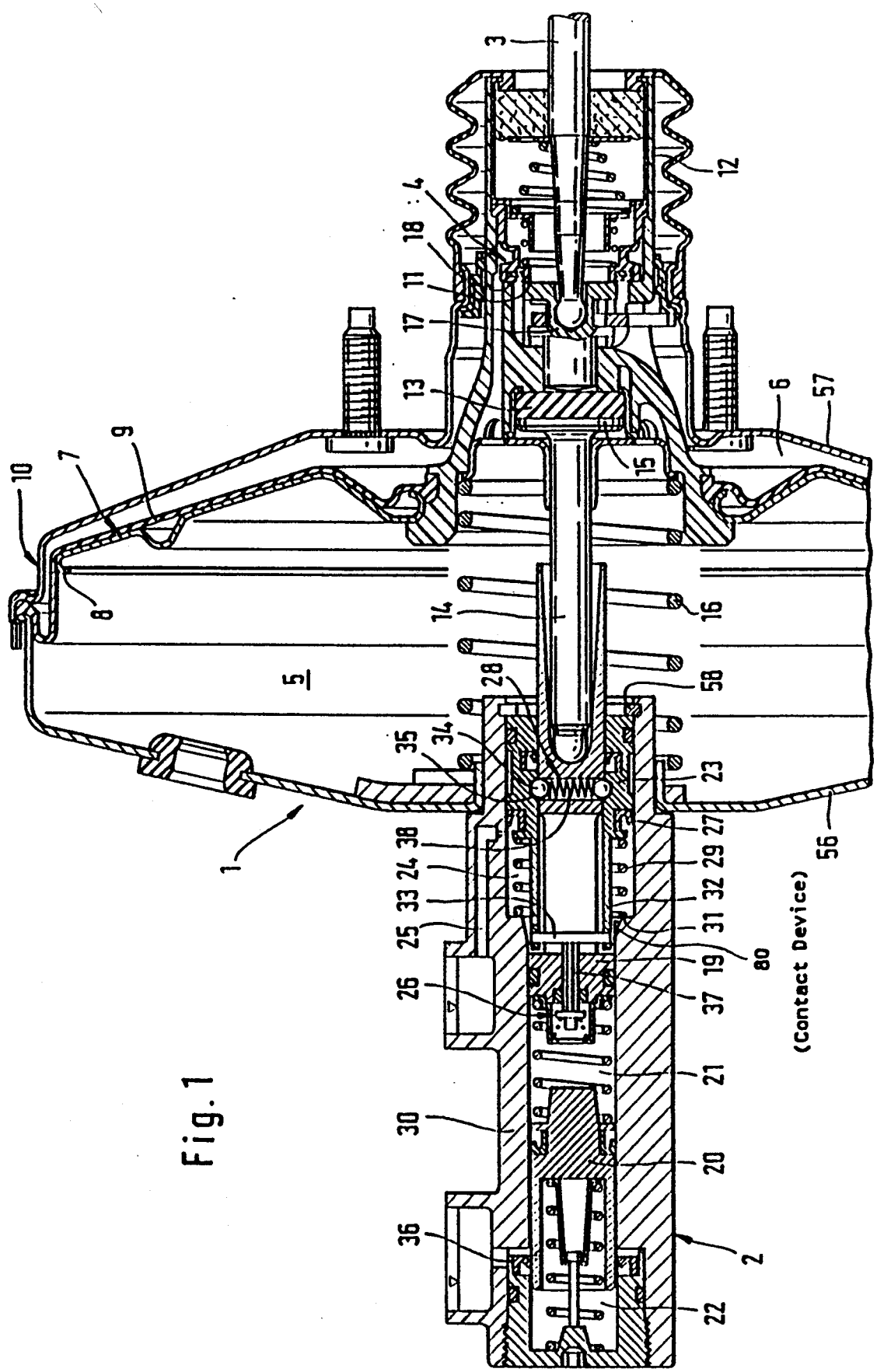
FIG. 1 is a first embodiment of the actuating unit according to the present invention.

The actuating unit shown in the drawing includes a vacuum brake power booster 1 and a master brake cylinder, preferably a tandem master cylinder 2. Tandem master cylinder 2 is connected downstream of the vacuum brake power booster 1 and communicates with a pressure fluid supply reservoir (not shown). The vacuum brake power booster 1 is operated through an actuating member 3 by a brake pedal (not shown). The vacuum brake power booster 1 is comprised of two shell-shaped housing halves 56 and 57, which are fitted with their open sides and which form a booster housing 10. The housing half 56, which is on the left in FIG. 1, is provided with a pneumatic port and is rigidly connected with the tandem master brake cylinder 2. The control housing 12, which accommodates a control valve 4, slides within and is sealed and guided by the right-hand housing half 57.

The booster housing 10 is subdivided into an evacuatable vacuum chamber 5 and a working chamber 6 by a first movable wall 7 which is arranged in the housing. The first movable wall is composed of a diaphragm plate 8 and a rolling diaphragm 9 which abuts on the diaphragm plate 8. The working chamber 6 can be connected either with the vacuum chamber 5 or, when the control valve 4 is actuated, with the atmosphere.

The control valve 4 is operated by a valve piston 17 which is coupled to the actuating member 3. The first sealing seat 11 of the control valve 4 is carried by the actuating member 3, while second sealing seat 18 of control valve 4 is provided in the control housing 12.

A resetting spring 16, which is supported on a flange on the vacuum-side end wall of the booster housing 10, keeps the movable wall 7 in the initial position shown. Via a rubber-elastic reaction disc 13 accommodated in a frontal recess of the control housing 12 as well as via a push rod 14 having a head flange 15, the brake force is transmitted onto a first piston (primary piston) 19 of the tandem master cylinder 2. The primary piston 19 cooperates with a second (secondary) piston 20, and together pistons 19, 20 confine pressure chambers 21 and 22 in the master cylinder housing 30. Brake circuits (not shown) are connected to the master cylinder housing 30.

An annular piston 23 of large diameter arranged co-axially relative to the primary piston 19 confines in the master cylinder housing 30 a filling chamber 24 of annular cross-section. The filling chamber 24 is connected via a pressure fluid channel 25 to a compensating or pressure fluid supply reservoir (not shown). The filling chamber 24 is also connected to the primary pressure chamber 21 through a central valve 26, which is preferably arranged in the primary piston 19, so that the filling chamber 24 simultaneously serves as a supply chamber for the primary pressure chamber 21.

The annular piston 23, which is sealed in relation to the master cylinder housing 30 by a sealing cup 27, is in force-transmitting connection with the primary piston 19 via a detachable locking device 28. The annular piston 23 cooperates with a stop 31 formed by a step designed in the master cylinder housing 30. The stop 31 supports a compression spring 29 which biasses the annular piston 23 in opposition to the actuating direction. In the release position or, respectively, in the actuated position after the locking device 28 is released, the annular piston 23 is pressed against a second stop 58 by the compression spring 29.

The annular piston 23 is provided with an axial extension 32 which supports a pin 33 that actuates the central valve 26. The locking device 28 can be formed by one or a plurality of resiliently preloaded balls 34, which are guided in the primary piston 19 and which cooperate with a slope 35 formed in the annular piston 23. For the employment of the described actuating unit in anti-lock brake systems, it is particularly expedient that the secondary piston 20 is designed as a plunger piston which cooperates with an immovable sealing cup 36 arranged in the master cylinder housing 30.

When the input member 3 is displaced by the brake pedal in the actuating direction, to the left in FIG. 1, the first sealing seat 11 provided on the valve piston 17 opens so that the working chamber 6 is ventilated. Since the vacuum chamber 5 is in permanent connection with a suitable vacuum source during operation, the pneumatic difference in pressure acting upon the movable wall 7 causes movement of the control housing 12 connected with the movable wall 7 in the actuating direction. This movement is transmitted to the primary piston 19 via the reaction disc 13 and the push rod 14. Because of the operative connection between the primary piston 19 and the annular piston 23, the latter is entrained by the primary piston 19, and the central valve 26 is kept open by its closure member 37 abutting on the pin 33. As a result, hydraulic pressure develops through the sealing cup 27 located on the annular piston 23 in both the filling chamber 24 and in the primary pressure chamber 21. This pressure causes displacement of the secondary piston 20 in the actuating direction.

Once the pressure developing in pressure chambers 21 and 24 reaches the level at which the force component acting on the balls 34 of the locking device 28 via the slope 35 formed in the annular piston 23 overcomes the force of the compression spring 38 biassing the balls 34, the locking device 28 will be released. This causes the annular piston 23 to uncouple from the primary piston 19 in terms of force transmission, and allows it to be reset to its initial position on the stop 58 by the effect of the compression spring 29. Simultaneously, the closure member 37 of the central valve 26 lifts from the pin 33, so that the primary pressure chamber 21 is isolated from the filling chamber 24. Further pressure increase in the primary pressure chamber 21 takes place via the sealing element of the primary piston 19.

It is also possible to provide a contact device 80 in the area of the stop 31 of the annular piston 23 by which an optical warning apparatus can be activated. Preferably, the optical warning device is a lamp, located in the field of vision of the vehicle driver.

Figure 2:
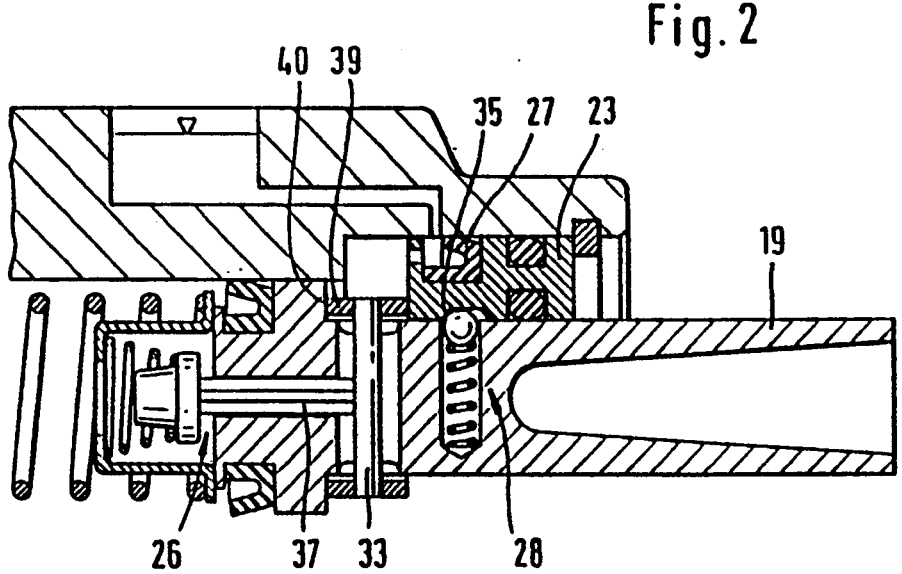
FIG. 2 is a second embodiment of the master cylinder of the actuating unit according to the present invention.
Figure 3:
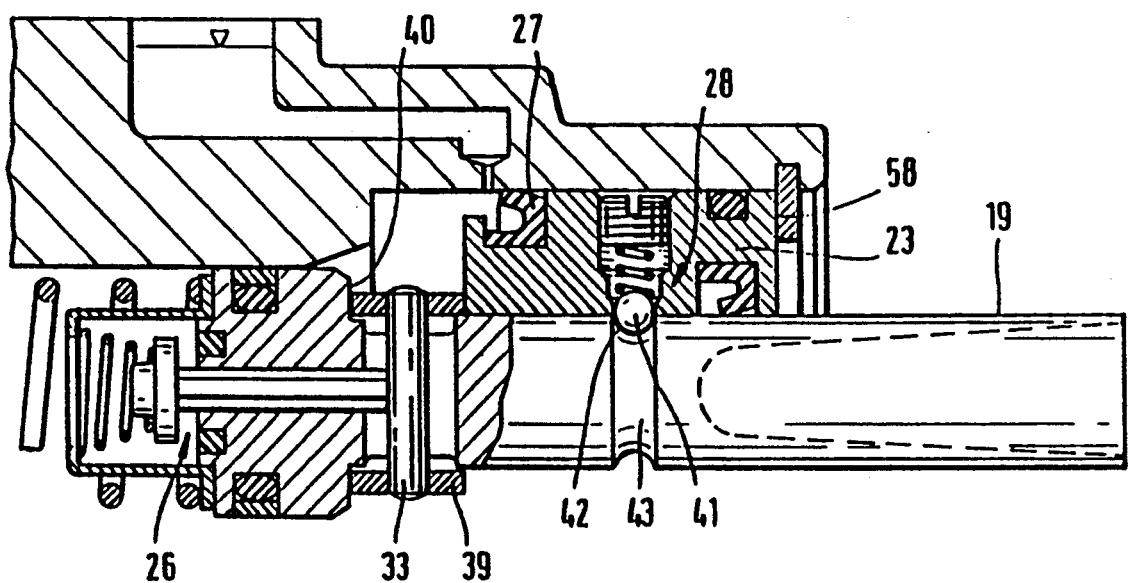
FIGS. 3 to 6 illustrate a third, a fourth, a fifth and a sixth embodiment of the master brake cylinder of the actuating unit according to the present invention.

As shown in FIGS. 2 and 3, the pin 33 forming the opening mechanism of the central valve 26 is arranged perpendicularly to the longitudinal axis of the master cylinder 2. The pin 33 is supported in a ring 39 slipped on the primary piston 19. In the release position of the actuating unit, the ring abuts axially on a radial annular surface 40 on the primary piston 19 and on the annular piston 23. While the design of the locking device 28 shown in FIG. 2 corresponds to the embodiment shown in FIG. 1, the locking device 28 shown in FIG. 3 is formed by one ball or a plurality of balls 41 guided in the annular piston 23 and cooperating with a slope 42. Slope 42 is provided in the primary piston 19 and is formed by a radial groove 43.

Figure 4:
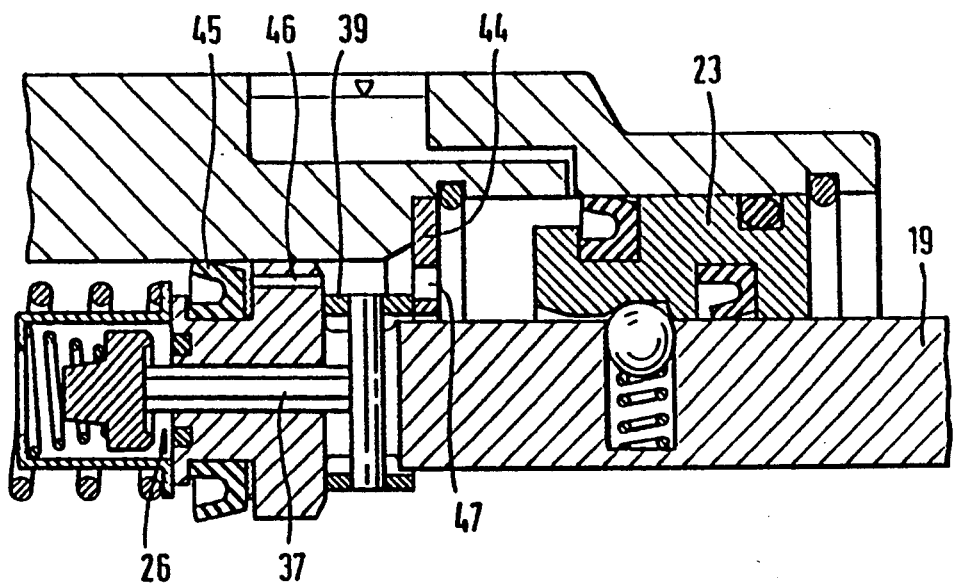

In the embodiment of the present invention shown in FIG. 4, ring 39 abuts on a stop formed fast with the master cylinder housing. This stop is formed by an annular disc 44 situated in the stop area of the annular piston 23. The result is that the primary pressure chamber 21 and the filling chamber 24 are already isolated from each other at the commencement of the actuation. Thus, fluid overflows the sealing cup 45 located on the primary piston 19 during the filling action. For this purpose, the primary piston 19 is furnished with axial bores 46 and the annular disc 44 contains passages 47.

Figure 5:
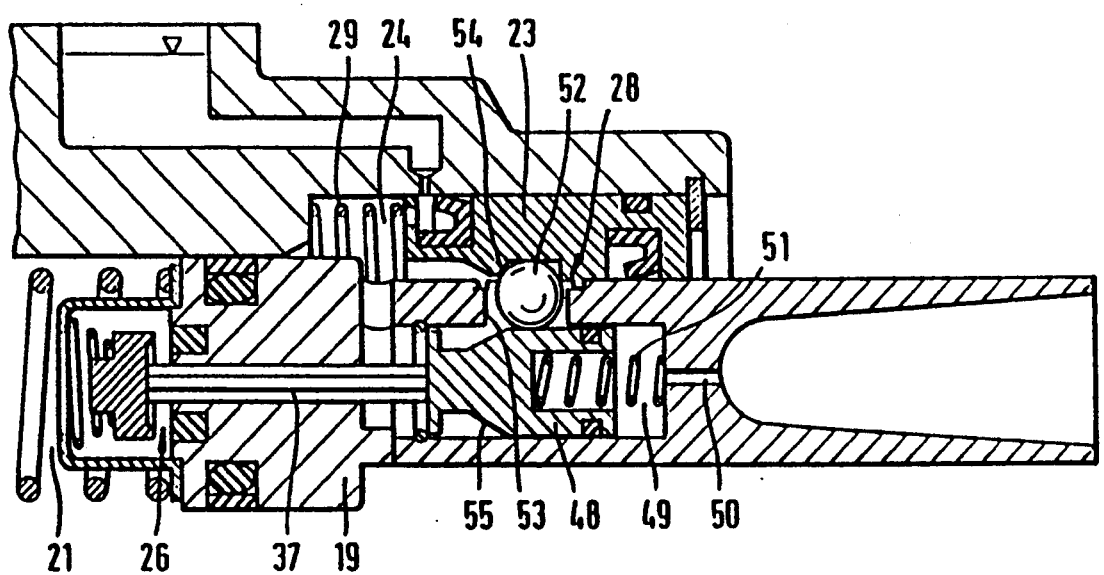
Figure 6:
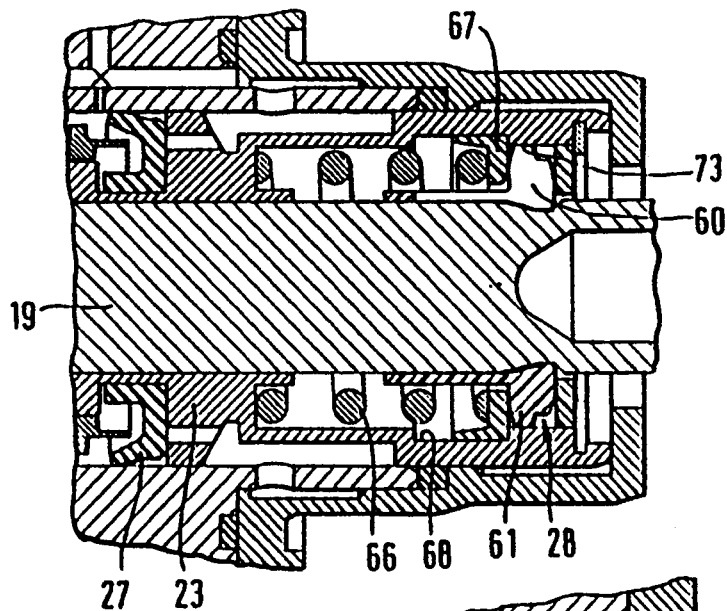

In the design variant of the present invention shown in FIG. 5, the closure member 37 of the central valve 26 abuts the end surface of an actuating piston 48 which slides within and is guided by the primary piston 19. The actuating piston 48 bounds a cylindrical chamber 49 which, as is shown, may be in communication with the vacuum chamber 5 of the brake power booster 1 via a bore 50 provided in the primary piston 19. The chamber 49 accommodates a compression spring 51, which biasses the actuating piston 48 in opposition to the closing direction of the central valve 26. In this embodiment, the locking device 28 is formed by locking balls 52, which are arranged in radial bores 53 of the primary piston 19. These locking elements cooperate with a first slope 54 provided in the annular piston 23 as well as with a second slope 55 provided on the actuating piston 48.

As described above, hydraulic pressure develops in pressure chambers 21 and 24 on actuation. The effect of this pressure on the actuating piston 48 generates a force which counteracts the force of the compression spring 51. When this spring force is overcome, the actuating piston 48 displaces to the right in the drawing, thereby closing central valve 26.

Simultaneously, the locking balls 52 move radially inward over the second slope 55 until they disengage the first slope 54 formed in the annular piston 23. As a result, the annular piston 23 uncouples from the primary piston 19 and can be positioned in the initial position by the compression spring 29.

Figure 7:
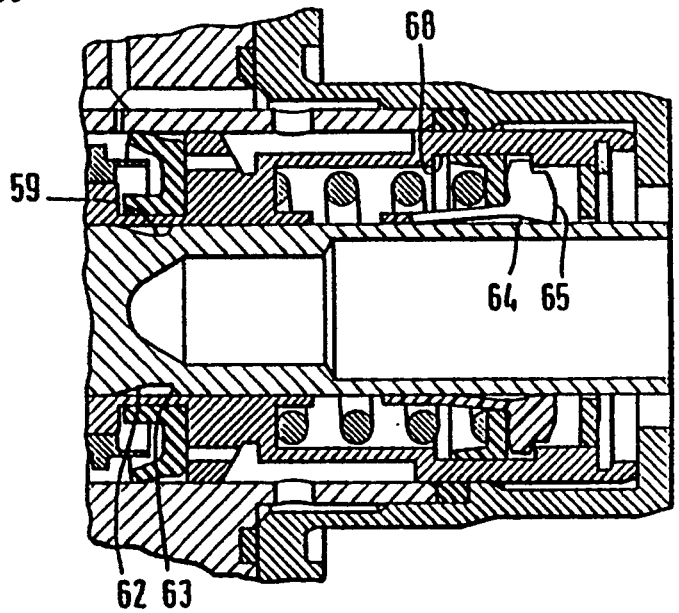
FIG. 7 is the sixth embodiment of the master brake cylinder according to FIG. 6 in the actuated condition.

Finally, as shown in FIGS. 6–9, locking device 28 is formed of a sleeve 60 which, preferably, is made of plastic and which, when slipped on the piston 19, is expandable in the radial direction. Sleeve 60 has a radial collar 61 with a radial inwardly disposed area of smaller diameter that defines a first conical annular surface 64 (FIG. 7). In the release position, the annular surface 64 is received in an annular groove 59 provided in the piston 19.

Annular groove 59 preferably has two transversely extending flanks 62 and 63, each of a different ascent. The first conical annular surface 64 of the collar 61 transitions into a second conical annular surface 65 which, on actuation of the piston 19, cooperates with the flank 63 of steeper ascent, as illustrated on the right-hand side of FIG. 6. The radial outwardly disposed larger-diameter area of the collar 61 is formed by a cylindrical surface 73, the diameter of which corresponds to the internal diameter of the annular piston 23. This cylindrical surface 73 serves as radial support for the sleeve 60 on the annular piston 23.

Force is transmitted between the sleeve 60 and the annular piston 23 via a spring 66 located between the sleeve 60 and the annular piston 23. The sleeve-side end of spring 66 is supported on a guide portion 67 which abuts axially on the collar 61. The annular piston is furnished with a radial annular groove 68 of rectangular cross-section. The radial annular groove 68 permits radial expanding of the sleeve 60, and thus unlocking of the locking device 28 after the force of the spring 66 has been overcome and the pistons 23 and 19 have separated. Simultaneously, the bottom of the annular groove 68 serves as a guide surface for the guide portion 67.

Figure 8:
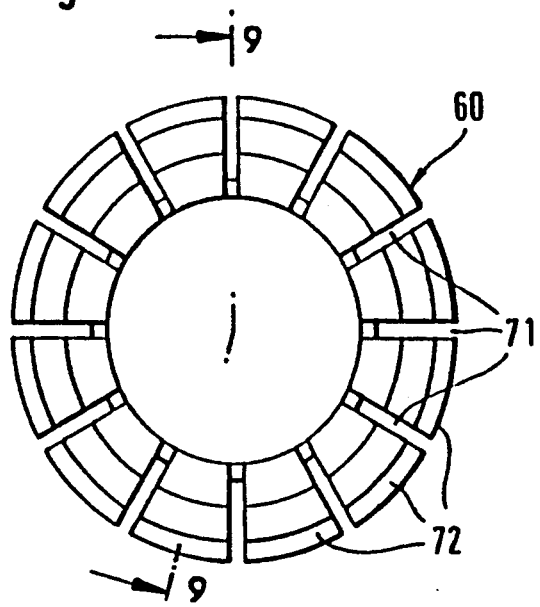
FIG. 8 is an axial view of a sleeve which serves as a locking device in the embodiment according to FIGS. 6 and 7.
Figure 9:
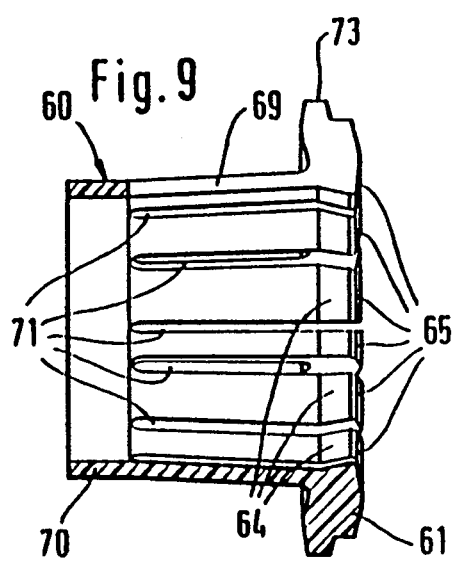
FIG. 9 is a cross-section of the sleeve shown in FIG. 8 taken along the line of intersection 9—9 according to FIG. 8.

As shown in FIGS. 8 and 9, a truncated-cone shaped area 69 is located adjacent to the radial collar 61 of the sleeve 60. The truncated-cone shaped area 69 transitions into a cylindrical portion 70, of internal diameter corresponding to the external diameter of the piston 19. The radial expansion of sleeve 60 during the unlocking of the locking device 28 is facilitated by a plurality of axial slots 71 which are evenly spread over the periphery of the sleeve 60. These axial slots 71 end at the transition between the cylindrical portion 70 and the truncated-cone shaped area 69 of the sleeve 60. The axial slots 71 subdivide the collar 61 and the area 69 into radially resilient segments 72.

The function of locking device 28 described above is almost identical to the function of those locking devices depicted in FIGS. 1 and 5. When the piston 19 is displaced in the actuating direction, the actuating force acting axially on the piston 19 is transmitted via the inclined flank 63 of the annular groove 59 to the second conical annular surface 65 of the collar 61, so that the annular piston 23 is entrained through the guide portion 67 and the spring 66. Simultaneously, a radial outwardly acting force component results. When the force of the spring 66 is overcome and the locking device 28 is unlocked, this radial outwardly acting force causes radial expansion of the collar 61 with concomitant expansion of the segments 72. The segments 72 are received in the annular groove 68, in the area of the annular groove 68 shaped in the annular piston 23.

List of Reference Numerals 1 vacuum brake power booster
2 tandem master cylinder
3 actuating member
4 control valve
5 vacuum chamber
6 working chamber
7 movable wall
8 diaphragm plate
9 rolling diaphragm
10 booster housing
11 sealing seat
12 control housing
13 reaction disc
14 push rod
15 head flange
16 resetting spring
17 valve piston
18 sealing seat
19 primary piston
20 secondary piston
21 pressure chamber
22 pressure chamber
23 annular piston
24 filling chamber
25 pressure fluid channel
26 central valve
27 sealing cup
28 locking device
29 compression spring
30 master cylinder housing
31 stop
32 extension
33 pin
34 ball
35 slope
36 sealing cup
37 closure member
38 compression spring
39 ring
40 annular surface
41 ball
42 slope
43 radial groove
44 annular disc
45 sealing cup
46 bore
47 passage
48 actuating piston
49 chamber
50 bore
51 compression spring
52 locking element
53 bore
54 slope
55 slope
56 booster housing half
57 booster housing half
58 stop
59 annular groove
60 sleeve
61 collar 62 flank
63 flank
64 annular surface
65 annular surface
66 spring
67 guide portion
68 annular groove
69 area
70 portion
71 slot
72 segment
73 surface

We claim:

1. An actuating unit for a hydraulic brake system comprising:

an actuating member responsive to movement of a brake pedal;
a pneumatic brake power booster having a housing and a movable wall subdividing said housing into a vacuum chamber and a working chamber;
a master brake cylinder having:
  (a) a housing,
  (b) a hydraulic pressure chamber adapted to develop hydraulic pressure,
  (c) a filling chamber connectible to said hydraulic pressure chamber, and
  (d) a primary piston responsive to movement of said actuating member, having a longitudinal axis, and confining said hydraulic pressure chamber;
a stop;
a contact device adapted to activate a warning apparatus, said contact device positioned in the area of said stop; and
an annular piston of diameter larger than that of said primary piston, said annular piston coupled to said primary piston, confining said filling chamber, adapted to be uncoupled from said primary piston when said pressure in said hydraulic pressure chamber reaches a predeterminable amount, and sliding on said primary piston and cooperating with said stop after being uncoupled from said primary piston.

2. An actuating unit for a hydraulic brake system comprising:

an actuating member responsive to movement of a brake pedal;
a pneumatic brake power booster having a housing and a movable wall subdividing said housing into a vacuum chamber and a working chamber;
a master brake cylinder having:
  (a) a housing,
  (b) a hydraulic pressure chamber adapted to develop hydraulic pressure,
  (c) a filling chamber connectible to said hydraulic pressure chamber, and
  (d) a primary piston responsive to movement of said actuating member, having a longitudinal axis, and confining said hydraulic pressure chamber;
a central valve situated in said primary piston between said filling chamber and said hydraulic pressure chamber;
an annular piston having an axial extension and a diameter larger than that of said primary piston, said annular piston coupled to said primary piston, confining said filling chamber, and adapted to be uncoupled from said primary piston when said pressure in said hydraulic pressure chamber reaches a predeterminable amount; and
a pin disposed perpendicularly to the longitudinal axis of said primary piston, located in said axial extension of said annular piston, and adapted to actuate said central valve.

3. An actuating unit for a hydraulic brake system comprising:

an actuating member responsive to movement of a brake pedal;
a pneumatic brake power booster having a housing and a movable wall subdividing said housing into a vacuum chamber and a working chamber;
a master brake cylinder having:
  (a) a housing,
  (b) a hydraulic pressure chamber adapted to develop hydraulic pressure,
  (c) a filling chamber connectible to said hydraulic pressure chamber, and
  (d) a primary piston responsive to movement of said actuating member, having a longitudinal axis and an annular groove, and confining said hydraulic pressure chamber;
an annular piston of diameter larger than that of said primary piston, said annular piston coupled to said primary piston, confining said filling chamber, and adapted to be uncoupled from said primary piston when said pressure in said hydraulic pressure chamber reaches a predeterminable amount; and
a detachable locking device between said primary piston and said annular piston permitting said primary piston to entrain said annular piston until the predetermined pressure amount is reached and having a radially expandable sleeve with a radial collar, said sleeve slipped on said primary piston and said radial collar of said sleeve cooperating with said annular groove of said primary piston.

4. An actuating unit in accordance with claim 3 wherein said primary piston has two transversely extending flanks of different ascent bounding said annular groove and said radial collar has a first conical annular surface and a second conical annular surface adjacent said first conical annular surface, said second conical annular surface cooperating with said flank of steeper ascent.

5. An actuating unit in accordance with claim 3 further comprising a spring interposed between said annular piston and said sleeve which permits the transmission of force from said sleeve to said annular piston.

6. An actuating unit in accordance with claim 5 wherein said annular piston has a radial annular groove having a bottom and permitting radial expansion of said sleeve on actuation and when the force of said spring is overcome.

7. An actuating unit in accordance with claim 6 further comprising a guide portion supporting said spring, having a cylindrical surface guided at the bottom of said radial annular groove of said annular piston, and abutting said radial collar of said sleeve.

8. An actuating unit in accordance with claim 3 wherein said sleeve has a truncated cone-shaped area into which said radial collar transitions and a cylindrical portion adjacent to said truncated cone-shaped area, said cylindrical portion having an internal diameter corresponding to the diameter of said primary piston.

9. An actuating unit in accordance with claim 8 wherein said sleeve has a plurality of axial slots, said axial slots evenly spread over the periphery of said sleeve, subdividing said radial collar into a plurality of segments, and terminating at the transition between said truncated cone-shaped area and said cylindrical portion.

10. An actuating unit in accordance with claim 3 wherein said sleeve is made of plastic.

* * * * *